United States Patent
Strassner

(10) Patent No.: US 10,027,536 B2
(45) Date of Patent: *Jul. 17, 2018

(54) SYSTEM AND METHOD FOR AFFINITY-BASED NETWORK CONFIGURATION

(71) Applicant: Futurewei Technologies, Inc., Plano, TX (US)

(72) Inventor: John Charles Strassner, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 283 days.

This patent is subject to a terminal disclaimer.

(21) Appl. No.: 14/315,065

(22) Filed: Jun. 25, 2014

(65) Prior Publication Data

US 2015/0381410 A1    Dec. 31, 2015

(51) Int. Cl.
*G06F 15/17* (2006.01)
*H04L 12/24* (2006.01)

(52) U.S. Cl.
CPC ...... *H04L 41/0803* (2013.01); *H04L 41/5054* (2013.01); *H04L 41/0233* (2013.01)

(58) Field of Classification Search
CPC . G06N 5/048; H04L 41/0233; H04L 41/0803; H04L 41/5054

(Continued)

(56) References Cited

U.S. PATENT DOCUMENTS

| | | | |
|---|---|---|---|
| 6,611,867 B1 * | 8/2003 | Bowman-Amuah | H04L 12/2602 709/218 |
| 7,340,522 B1 | 3/2008 | Basu et al. | |

(Continued)

FOREIGN PATENT DOCUMENTS

| | | |
|---|---|---|
| CN | 102004671 A | 4/2011 |
| CN | 103703724 A | 4/2014 |

(Continued)

OTHER PUBLICATIONS

Affinity Networking for Data Centers and Clouds Solution Overview, Plexxi, Inc., Dec. 2012, pp. 1-5.*

(Continued)

*Primary Examiner* — Moustafa M Meky
*Assistant Examiner* — Thorne E Waugh
(74) *Attorney, Agent, or Firm* — Slater Matsil, LLP

(57) ABSTRACT

Embodiments are provided to perform affinity analysis and management of network services. The embodiments use model-driven engineering to capture more generic affinity-based relationships, including between applications and endpoints and between customers and the network infrastructure. In an embodiment method, upon receiving at a network component a request for an application, affinity analysis is performed on the application. A network configuration is then determined according to results of the affinity analysis. The affinity analysis is performed and the network configuration is determined according to business rules defining application and customer priorities. The business rules are defined using a single information model and implemented using at least one data model. The network infrastructure is then configured according to the affinity analysis and the network configuration.

21 Claims, 8 Drawing Sheets

(58) Field of Classification Search
USPC .................................................. 709/203–238
See application file for complete search history.

(56) References Cited

U.S. PATENT DOCUMENTS

| | | | |
|---|---|---|---|
| 8,244,874 B1 | 8/2012 | Thireault | |
| 8,356,087 B1* | 1/2013 | Miller | H04L 63/0272 709/220 |
| 8,843,894 B2* | 9/2014 | Dawson | G06F 9/5027 717/124 |
| 9,294,437 B1* | 3/2016 | Ganguly | H04L 63/0272 |
| 9,301,026 B2* | 3/2016 | Srinivas | H04Q 3/0083 |
| 2004/0230681 A1 | 11/2004 | Strassner et al. | |
| 2007/0043860 A1* | 2/2007 | Pabari | G06F 9/5072 709/224 |
| 2008/0161941 A1 | 7/2008 | Strassner et al. | |
| 2008/0271022 A1 | 10/2008 | Strassner et al. | |
| 2010/0306354 A1 | 12/2010 | DeHaan et al. | |
| 2010/0306382 A1 | 12/2010 | Cardosa et al. | |
| 2011/0131309 A1 | 6/2011 | Akiyama et al. | |
| 2012/0140636 A1* | 6/2012 | Resende | H04L 45/124 370/238 |
| 2013/0108259 A1 | 5/2013 | Srinivas et al. | |
| 2013/0108264 A1 | 5/2013 | Deruijter et al. | |
| 2014/0344453 A1* | 11/2014 | Varney | H04L 41/0803 709/224 |
| 2015/0334696 A1 | 11/2015 | Gu et al. | |
| 2015/0381410 A1 | 12/2015 | Strassner | |
| 2017/0031623 A1 | 2/2017 | Gong et al. | |

FOREIGN PATENT DOCUMENTS

| | | |
|---|---|---|
| CN | 104137482 A | 11/2014 |
| EP | 3143511 A1 | 3/2017 |
| WO | 2010056545 A1 | 5/2010 |
| WO | 2013138096 A1 | 9/2013 |
| WO | 2013159291 A1 | 10/2013 |

OTHER PUBLICATIONS

Ajay et al., "VMware Distributed Resource Management: Design, Implementation, and Lessons Learned", VMware Technical Journal (VMTJ), VMware Labs 1, 9 vol. 1, No. 1, Mar. 1, 2012, pp. 45-64, XP002758845.

Li et al., "An Integrated Approach to Automatic Management of Virtualized Resources in Cloud Environments", The Computer Journal, vol. 54, No. 6, Nov. 24, 2010, pp. 905-919, XP055412777.

* cited by examiner

SYSTEM AND METHOD FOR AFFINITY-BASED NETWORK CONFIGURATION

TECHNICAL FIELD

The present invention relates to network communications and virtualization, and, in particular embodiments, to a system and method for affinity-based network functions virtualization.

BACKGROUND

In the context of network communications, affinity defines a relationship between entities that describes a preference for two or more entities to communicate and/or perform operations on each other using a particular set of resources (instead of a randomly chosen set of resources). Hence, affinity is a concept that is independent of any one particular device or communication. Rather, affinity refers to communications that have known patterns between entities (as opposed to a communication that is random in nature). For example, processor affinity associates a process to a set of particular physical central processing units (CPUs), instead of randomly choosing a CPU. Affinity can also apply to other resources, such as memory, for example. This takes advantage of a particular CPU or other resource having executed or processed one or more similar processes beforehand, enabling subsequent processes to reuse the results of those previous processes. Hence, instead of wasting time and removing all effects of previous executions, affinity enables communications and operations that are similar in nature to reuse state and processes. Efficient architecture and scheme are needed for enabling affinity-based networking between customers and the network infrastructure.

SUMMARY OF THE INVENTION

In accordance with an embodiment, a method performing affinity-based network configuration by a network component includes receiving a request for an application, performing affinity analysis on the application, and determining a network configuration according to results of the affinity analysis. The network configuration utilizes affinity between the application and a network infrastructure. The method further includes configuring the network infrastructure according to the affinity analysis and the network configuration.

In accordance with another embodiment, a method performing affinity-based network configuration by a network component includes receiving a plurality of application requests and prioritizing applications associated with the application requests according to business rules. The business rules define different application and customer priorities. The method further includes detecting any new or changed affinities between the applications and a network infrastructure. A network topology is then determined in accordance with any new or changed affinities, prioritizing the applications, and current network infrastructure capabilities. The network topology defines which applications and customers use which resources and paths in the network infrastructure. The network infrastructure is configured according to the network topology.

In accordance with yet another embodiment, a network component for affinity-based network configuration comprises at least one processor and a non-transitory computer readable storage medium storing programming for execution by the at least one processor. The programming includes instructions to perform affinity analysis on a request for an application, and determine a network configuration according to results of the affinity analysis. The network configuration utilizes affinity between the application and a network infrastructure. The programming further includes instructions to configure the network infrastructure according to the affinity analysis and the network configuration.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Currently, both Software-Defined Networks (SDN) and Network Functions Virtualization (NFV) are being defined to provide virtualized communications. Both can benefit from affinity-based networking. Affinity-based networking can include defining an affinity service, with a corresponding application programming interface (API), to enable applications to specify intent about how their application or service works independent of the underlying infrastructure. In this approach, the affinity service enables information exchanged between the applications and the infrastructure control layer to be defined by a set of primitives. Hence, affinities provide a higher-level abstraction of infrastructural building blocks, such as ports, that enable applications to describe their needs to a manager, which in turn is responsible for configuring the infrastructure.

Disclosed herein are system and method embodiments that extend the concept of affinities to perform affinity modeling and management of network services. The embodiments use model-driven engineering to capture more generic affinity-based relationships, not just between applications and endpoints, but between customers and the network infrastructure. The affinity modeling includes modeling requirements of applications in a manner enabling the requirements to be used to optimize network services on behalf of the applications that depend on these network services. The embodiments enable the network to provide for optimized processing of a set of applications based on the concept of affinity. Affinity is defined herein as an inherent similarity between the needs of a set of applications and the capabilities that a network-based infrastructure provides. This similarity implies that some elements in the system need to communicate and/or interact with some other set of specific elements more than they do with other elements. The embodiments provide mechanisms for computing affinity that enables a set of applications to efficiently use network infrastructure.

Figure 1:
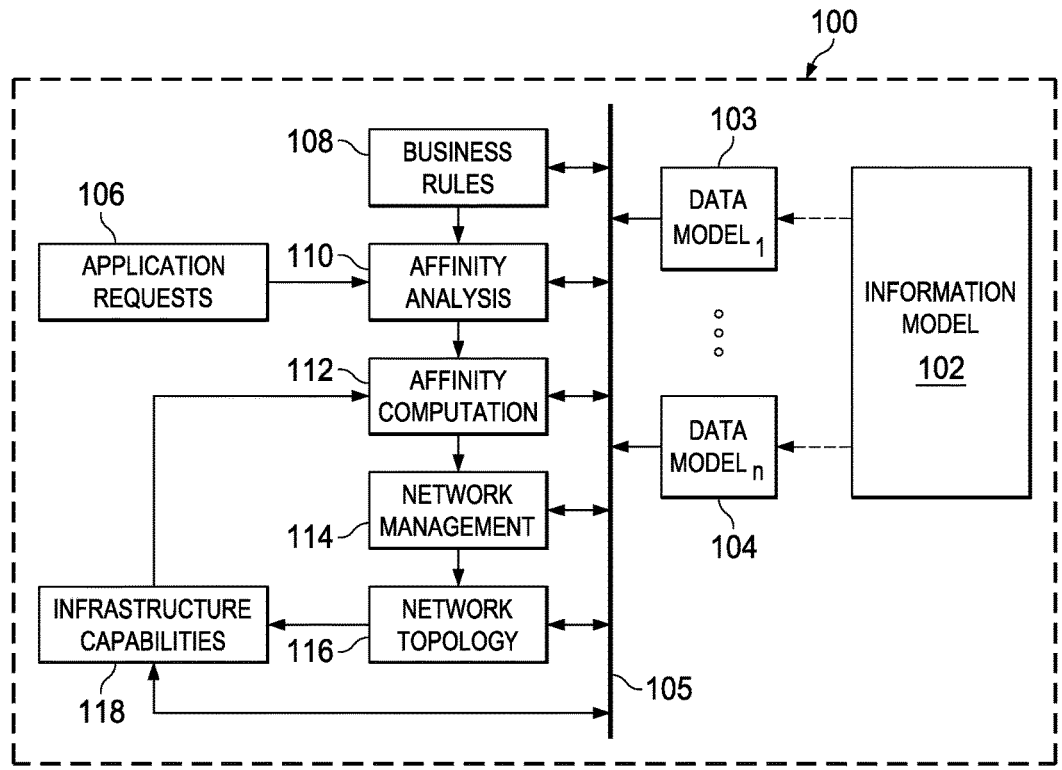
FIG. 1 illustrates an embodiment of an architecture for a model-driven affinity-based network functions virtualization (NFV) management system.

FIG. 1 shows an embodiment of a high-level architecture 100 for a model-driven affinity-based NFV management system. The architecture 100 includes an information bus 105 and application requests 106. The information bus 105 enables any communications and/or interaction to transpire between the other components of the architecture 100. The application requests 106 are analyzed by an affinity analysis module 110, which determines if affinities exist between new application requests and the network infrastructure. A set of business rules 108 are used to prioritize the order of importance of applications. This is needed when multiple applications request the same shared resources in the infrastructure. In an implementation, the business rules are defined by the information model, and are implemented using one or more data models. The output of the affinity analysis module 110 is sent to an affinity computation module 112, which combines the affinity information with data from the network to determine how to reconfigure the network to make use of affinity data. The results are then sent to a network management system 114, which configures the infrastructure appropriately to provide a network topology 116. Concurrently, infrastructure capabilities 118 are derived from the currently configured infrastructure. The derived information represents adjustments that can be made using the affinity analysis module 110 by representing these capabilities using an information model. The capabilities are fed back to the affinity computation module 112 to enable further optimizations. This defines a closed feedback loop, so that as business needs and the environment change, the system recognizes those changes and recalculates the affinities. The information bus 105 enables the components 108 to 118 above to communicate, or otherwise interact with, various data models (e.g., the two data models 103 and 104).

The architecture 100 also includes an object-oriented information model 102, which provides the definition of entities and their relationships that are used by the managed environment. An entity represents objects that have a separate and distinct existence (e.g., they are not just a collection of values), and is important to the management environment. Entities can be either managed or unmanaged. A manageable entity is defined as any entity of interest in a managed environment that can perform and/or respond to management functions. Examples of manageable entities include devices (e.g., routers, switches, host computers), entities that are part of a device (e.g., physical ports and logical device interfaces), as well as protocols, applications, servers, and services, or other entities that can respond to management requests. Manageable entities may be referred to as manageable objects by vendors.

The information model 102 is independent of platform, language, and protocol. An information model is an abstraction and representation of the entities in a managed environment. This includes definition of their attributes, operations and relationships. The information model is independent of any specific type of repository, software usage, or access protocol. The data models 103 and 104 are each derived from the information model 102, and represent the mapping of the technology-neutral abstraction of entities and their relationships into a form suitable for implementation. A data model is a concrete implementation of an information model in terms appropriate to a specific type of repository that uses a specific access protocol or protocols. The data model includes data structures, operations, and rules that define how the data is stored, accessed and manipulated. The data models (e.g., models 103 and 104) can be represented using model elements from the information model 102. A model element defines abstractions that can be represented in an information model. Examples of model elements include class, attribute, different types of relationships (e.g., associations, aggregations, and compositions), and other constructs.

The objects in the data models are then made available to the modules 108 to 118. The information model 102 provides cohesion, as well as a common vocabulary, for each module to use. For example, a business rule 108 can be related to how affinity is defined and used. The business rule 108, the concept of affinity, and the services and resources that are bound together using affinity can all be represented as manageable entities in the information model 102. This makes it easier for application developers to define and use rules to manage affinity-based services. The modules and components of the architecture 100 can be implemented via software, hardware (e.g., network servers and nodes), or a combination of both.

Figure 2:
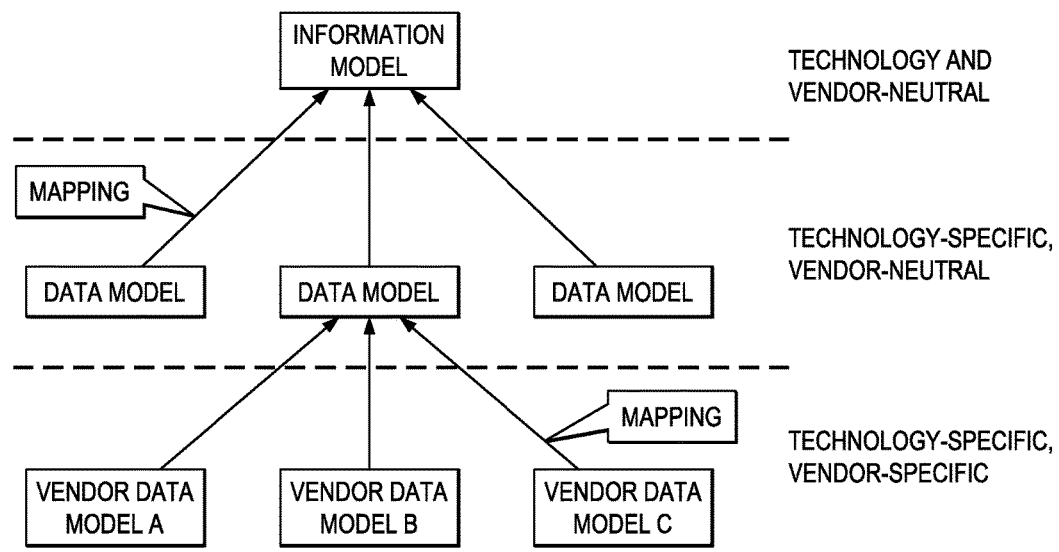
FIG. 2 illustrates an embodiment of model mapping between an information model and multiple data models.

FIG. 2 shows an embodiment of model mapping between a single information model and three different data models, for instance one data model based on relational algebra, a second data model for NoSQL, and a third data model for directory technologies. A model mapping is a translation from one type of model to another type of model. Model mapping can change the representation and/or level of abstraction used in one model to another representation and/or level of abstraction in another model. A common concept, such as a customer or a router, can be represented in each of the three data models shown. However, the structure of the information of this concept can be different in each case. Furthermore, any of the vendor-neutral (but technology-specific) data models above, such as one for relational databases using SQL92, could be translated into a vendor-specific form. This is another type of mapping. For example, the SQL92 model is independent of vendor implementation, but each vendor has their own extensions and implementation of SQL92 that provide added value. In another example, the models 102, 103, and 104 in FIG. 1 could be the DEN-ng information model, an Oracle relational database management system (RDBMS), and a Neo4j NoSQL repository, respectively.

Figure 3:
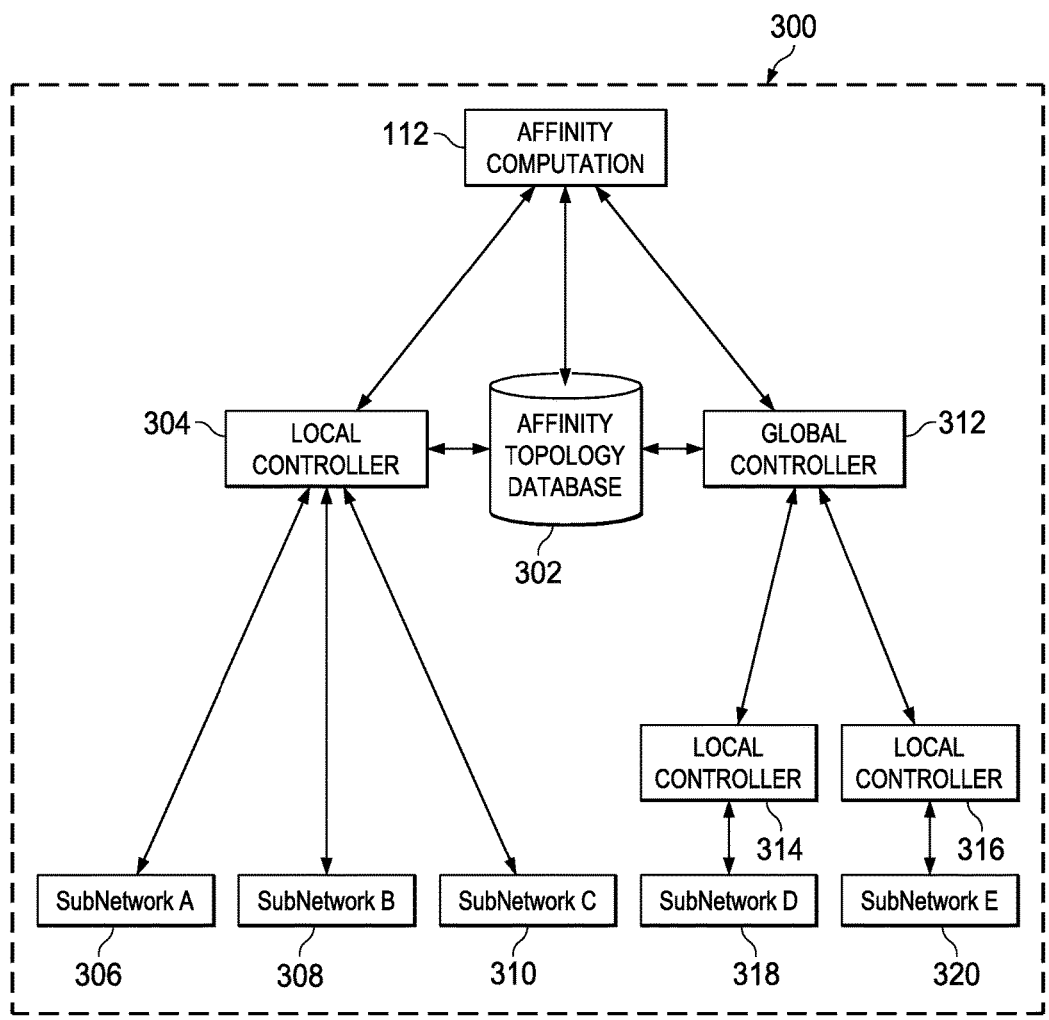
FIG. 3 illustrates an embodiment of an affinity-based network macro controller with exemplar management topologies that use affinity-based networking.

FIG. 3 shows an embodiment of an affinity-based network macro controller 300 with exemplar management topologies that use affinity-based networking. In the following discussion, a "controller" is a management entity that is responsible for collecting data about the set of entities that it manages, computing any changes that are required (e.g., to protect a customer's SLA), and then sending the device- and technology-specific commands to the device to reconfigure it). In the controller 300, the affinity computation module 112 of the architecture 100 stores its results in an affinity topology database 302, and also sends its results to all controllers that are currently being used in the network. This architecture includes controllers which serve as management systems to control the network infrastructure. This enables implementation in legacy as well as future network management systems. Such controllers can include local controllers 304, 314, and 316 in their respective domains. The controllers can also include an inter-domain or global controller 312 that manages the local controllers 314 and 316. The local controllers 304, 314, and 316 are responsible for configuring, using the results of the affinity computation, one or more sub-networks, e.g., the sub-networks 306 to 310 in a first domain and the sub-networks 318 to 320 in a second domain. The global controller 312 is responsible for configuring the local controllers that it manages.

Figure 4:
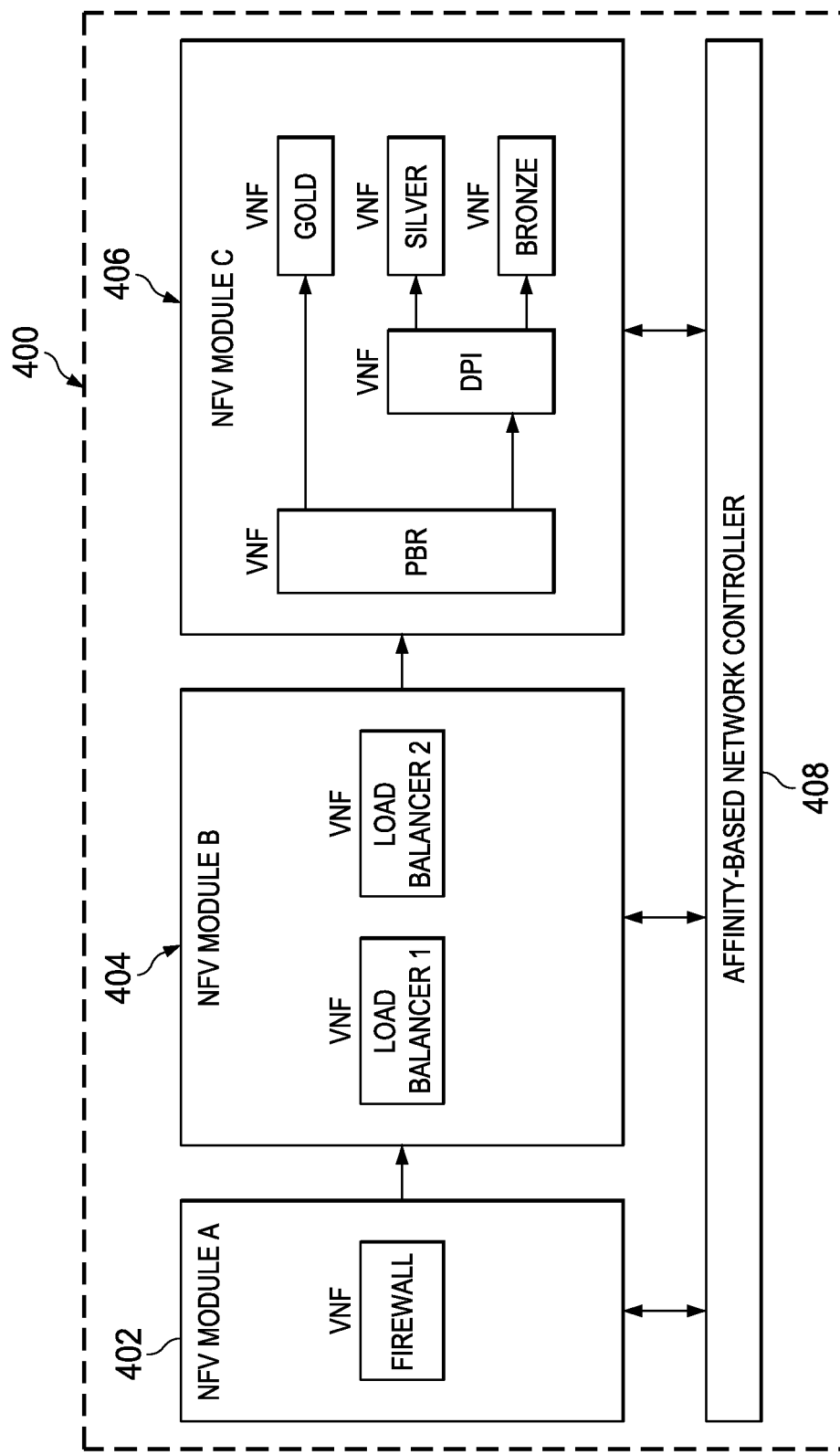
FIG. 4 illustrates an embodiment of an affinity-based network micro controller using VNFs to build a customizable chain of services.

FIG. 4 shows an embodiment of an affinity-based network micro controller 400 using Virtualized Network Functions (VNFs) to build a customizable chain of services. Each of the NFV modules 402, 404, and 406 provide different services to traffic that they receive. An affinity-based network controller 408 is used to determine the different affinities that exist between the different sub-networks, the traffic that flows between them, and which services from which NFV modules should be applied to each traffic stream. The affinity-based network controller 408 retrieves information required to configure the affinity between a set of services and a set of resources from one or more data models. The affinity-based network controller 408 also creates appropriate configuration commands for programming each of the components of each of the NFC modules 402, 404, and 406 above. Since all manageable entities are represented in the information model, they form a coherent set of processing operations.

Figure 5:
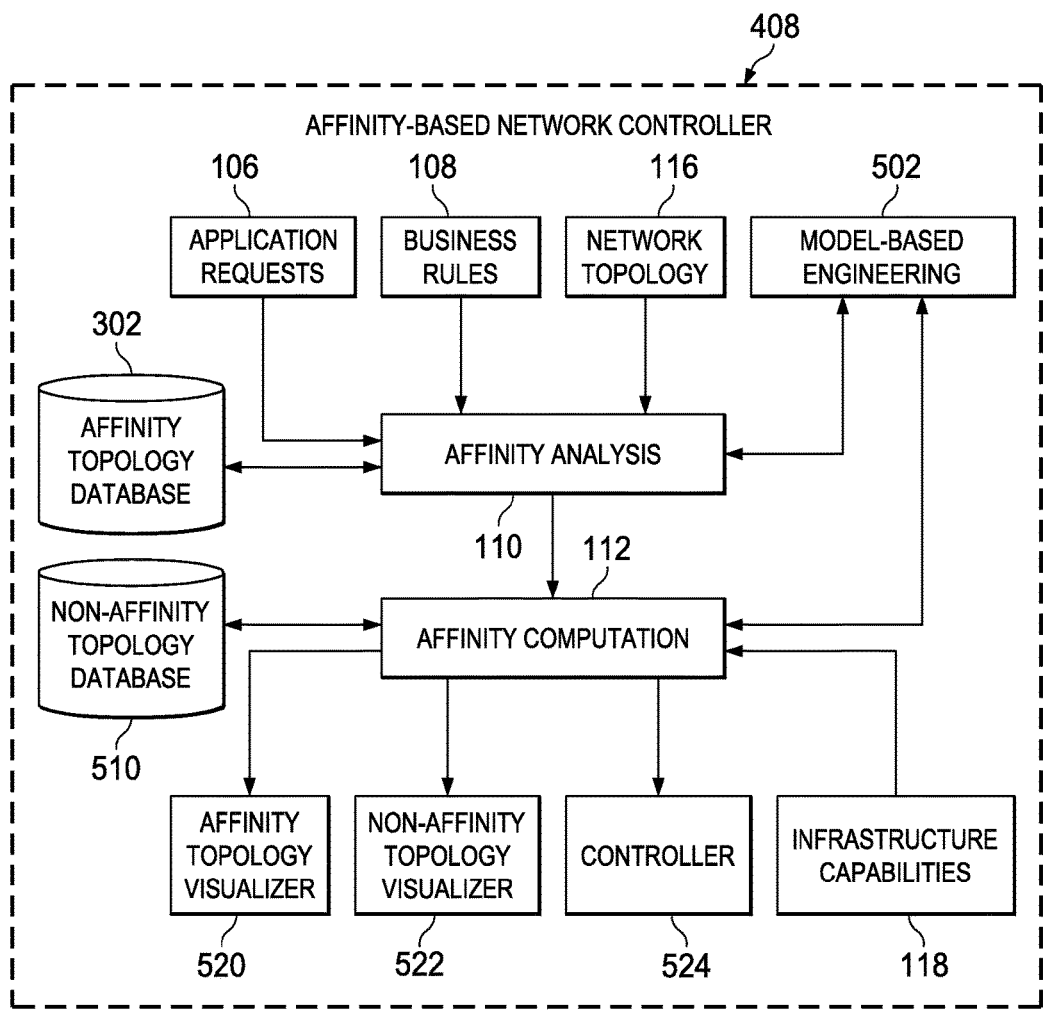
FIG. 5 illustrates an embodiment of the affinity-based network controller of FIG. 4 with more details.

FIG. 5 shows an embodiment of the affinity-based network controller 408 with more details. The affinity-based network controller 408 has three types of inputs. In the controller 408, the application requests 106 (of the architecture 100) represent raw traffic to be analyzed to discover affinity relationships. The business rules 108 define different priorities and other semantics that are taken into account by the affinity analysis module 110. The business rules 108 abstract the importance of various affinity rules, enabling conflicts between them to be resolved by various means (e.g., prioritizing the importance of different rules if two or more can be applied at the same time to the same traffic). The network topology 116 includes information that defines which applications and customers are currently using which resources and paths in the infrastructure. The affinity analysis module 110 uses affinity topology information in the affinity topology database (DB) 302 to compute network topology. The difference between the network topology in 116 and the network topology in 302 is that the former includes the effect of affinity being applied, whereas the latter is limited to identifying opportunities where affinity could be applied.

Additionally, a model-based engineering module 502 uses a variety of data models (that are each derived from an information model 102), which are stored in models DB 504, to generate code to support the operations of the affinity analysis module 110 and the affinity computation module 112. The output of the affinity computation module 112 is fed to three different modules. An affinity topology visualizer 520 and a non-affinity topology visualizer 522 enable users to see the results of the affinity analysis and computation processes by showing traffic that affinity is and is not applied to, respectively. The controller 524 corresponds to both global and local controllers (e.g., the global controller 312 and the local controllers 304, 314, and 316 in FIG. 3). Further, the infrastructure capabilities 118 represent additional network-based services that could be made available through additional configuration of the network infrastructure, for instance by provisioning additional bandwidth, latency, and/or other network metrics. The affinity computation module 112 uses non-affinity topology information in a non-affinity topology DB 510 to compute this type of network topology.

Figure 6:
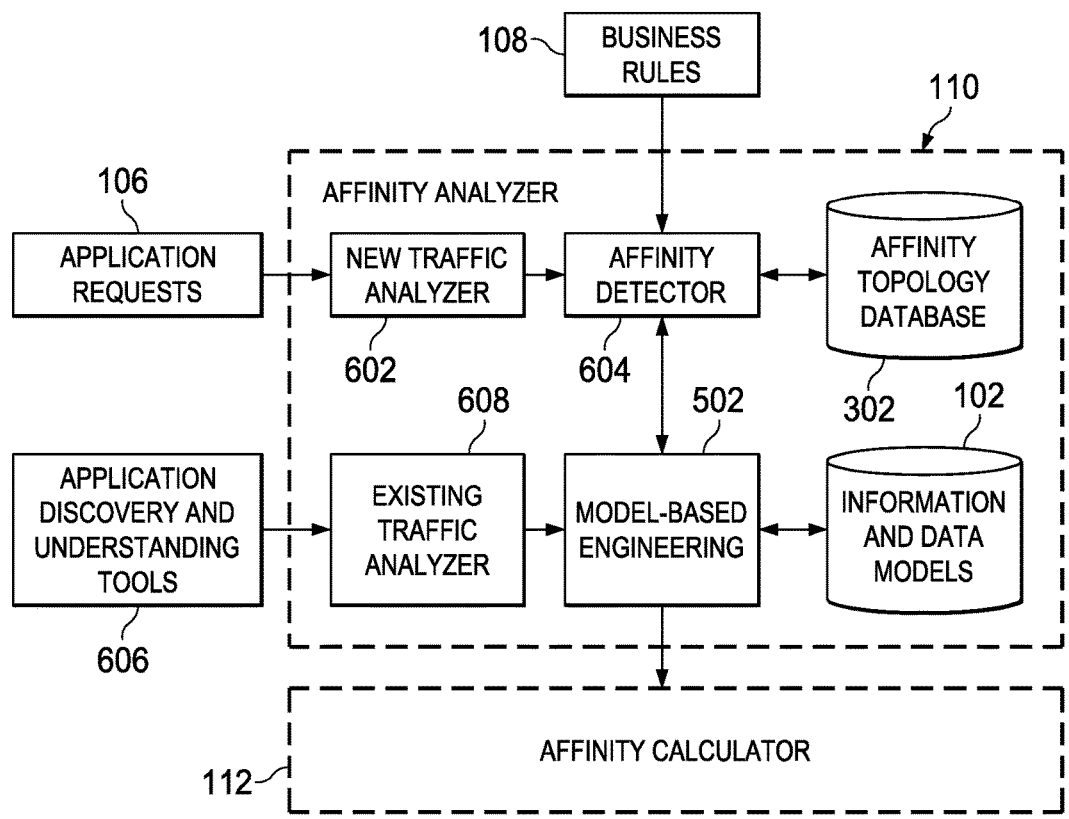
FIG. 6 illustrates an embodiment of an affinity analysis module of the architecture in FIG. 1 with more details.

FIG. 6 shows an embodiment of the affinity analysis module 110 with more details. The affinity analysis module 110 determines new traffic and application affinities, prioritizes them using applicable business rules, and then compares their needs and operation with the current network utilization. These results are then sent to the affinity computation module 112, which uses the capabilities of the infrastructure capabilities 118 to determine if new application requests should be routed over existing paths and use existing resources, or if new paths and/or resources should be used to service new traffic.

The application requests 106 represents raw (or preprocessed) traffic to be analyzed to discover affinity relationships. A new traffic analyzer 602 in the affinity analysis module 110 is used to analyze new application requests. The new traffic analyzer 602 uses a combination of existing management tools (e.g., protocol analyzers (e.g., nGenius, Wireshark, tcpdump), log analyzers (e.g., Syslog, Splunk), element and network management systems (e.g., Tivoli), virtualization management tools (e.g., vSphere), and custom software tools). An affinity detector 604 in the affinity analysis module 110, in conjunction with the model-based engineering module 502, examines the new application traffic and matches traffic flows with models that identify applications, customers, and other pertinent information. This enables the affinity detector 604 to use business rules to prioritize different flows from different applications, based on customer, time of day, Service Level Agreement (SLA), amount of congestion in the network, and/or other factors.

The business rules 108 (in the architecture 100) define different priorities and other semantics that should be taken into account by the affinity detector 604. The business rules are used to decouple the definition of affinity from its implementation. Specifically, business rules use a simple grammar or syntax that is conducive for program managers, analysts, and application developers, and does not resemble the low-level programming required to configure network devices. In this way, the business rules represent a "DevOps" point-of-view (Developer Operations, the confluence of business, IT, and networking people programming services in the network) viewpoint, as opposed to a more traditional "NetOps" (Network Operations, epitomized by a skilled engineer telnetting into a device and manually typing configuration changes to the device) point-of-view.

A variety of tools can be used to retrieve key or useful statistics and information from existing applications. An existing traffic analyzer 608 can use tools such as application discovery understanding tools 606 (e.g., IBM Infosphere), application performance management tools (e.g., Foglight, Riverbed), and protocol analyzers. The existing traffic analyzer 608 works with the model-based engineering module 502 to identify existing traffic in the infrastructure, and determine how the traffic has evolved (e.g., whether it is compliant with its SLAs, whether it is behaving as expected, whether there is more traffic than was anticipated). The results of this analysis is combined with the output of the affinity detector 604 by the model-based engineering module 502, and delivered to the affinity computation module 112.

The model-based engineering module 502 uses the information model (in FIG. 1) to create one or more data models (e.g., the data models 103 and 104) as needed. The models abstract the knowledge and information present in a given domain. The model-based engineering module 502 uses this knowledge to manage the definition and assignment of affinities. Specifically, the concepts of affinity, and how different entities are related by affinity, are abstracted through the use of information and data models. The model-based engineering module 502 enables the system to work with abstractions of affinity, e.g., rather than abstractions that are rooted in the capabilities of a particular computing paradigm. For example, domain-specific concepts can be used, instead of generic elements from a programming language, to better model affinity and affinity-based relationships.

Figure 7:
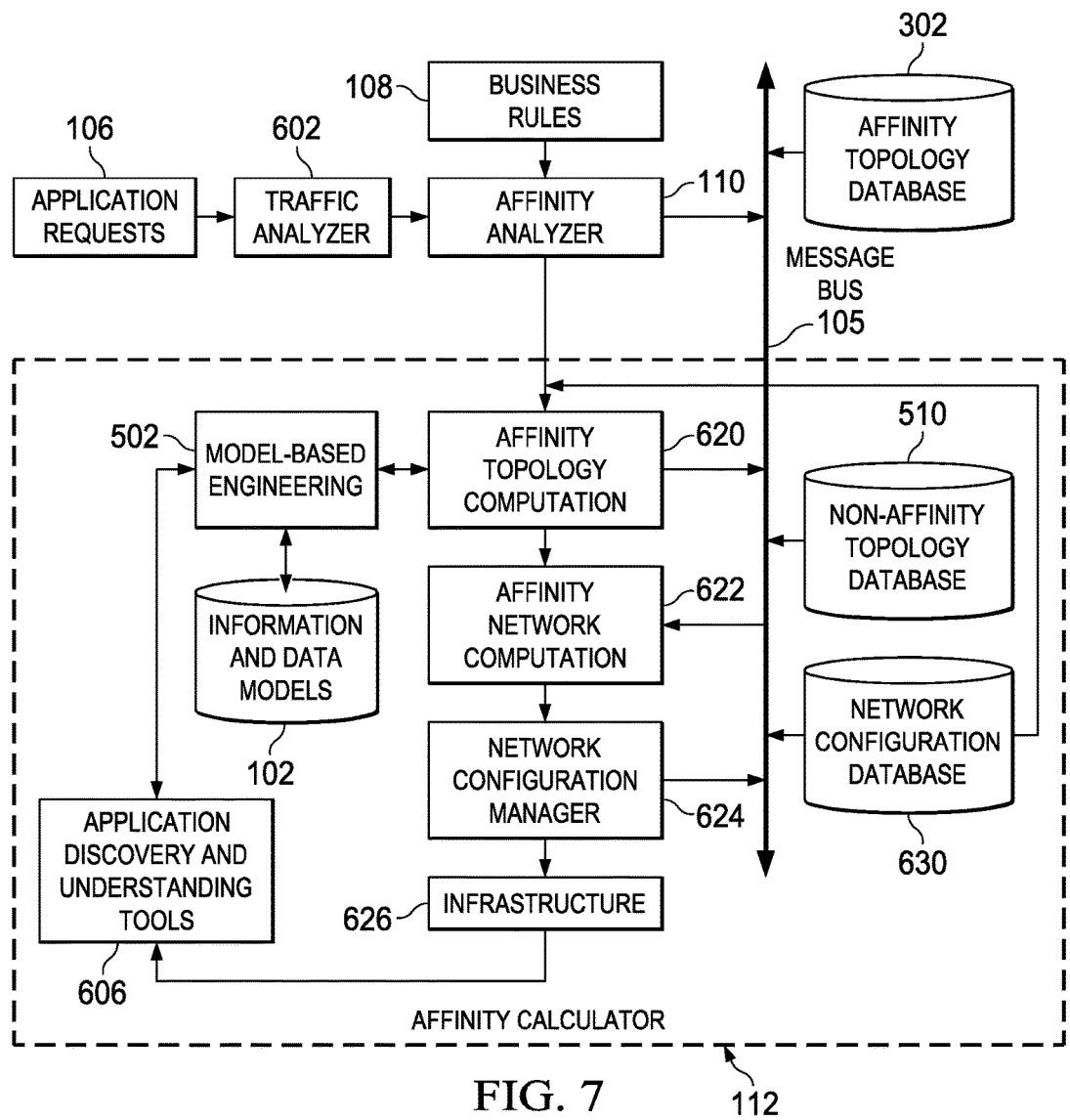
FIG. 7 illustrates an embodiment of an affinity computation module of the architecture of FIG. 1 with more details.

FIG. 7 shows an embodiment of the affinity computation module 112 with more details. An affinity topology computation module 620 consolidates all pertinent information from the affinity analysis module 110, and outputs a set of tuples describing such information to an affinity network computation module 622. An example tuple is in the form {FlowID, AppID, CustomerSLAID, NetworkPath, NetworkPathHealth}, where FlowID is an unambiguous identifier for a particular application's flow, AppID is an unambiguous identifier for a particular application, CustomerSLAID is an unambiguous identifier for a particular customer's SLA, NetworkPath is a listing of the network node ports that a particular flow travels through, and NetworkPathHealth defines various health metrics for the NetworkPath. The affinity topology computation module 620 also communicates with the model-based engineering module 502, which use the information and data models DB 504.

The output of the affinity topology computation module 620 is sent to the affinity network computation module 622, which can then construct two logical topologies. The affinity network computation module 622 first re-computes (if necessary) the network topology using the non-affinity topology DB 510. The affinity network computation module 622 then computes the possible network affinities using the affinity topology DB 302 (in FIG. 5) and determines where the affinity topology could overlay an existing network infrastructure and/or change the existing topology to take advantage of discovered affinities. The affinity network computation module 622 then calculates whether the network affinities should be programmed into the network or not using the current set of network capabilities. The output of the affinity network computation module 622 can contain candidate changes to both the affinity topology and the non-affinity topology. These changes are verified and implemented by a network configuration manager 624 using its current network configuration DB 630, thus providing a suitable network infrastructure 626. The results can also be fed back to the application discovery understanding tools 606 which communicates with the model-based engineering module 502.

Figure 8:
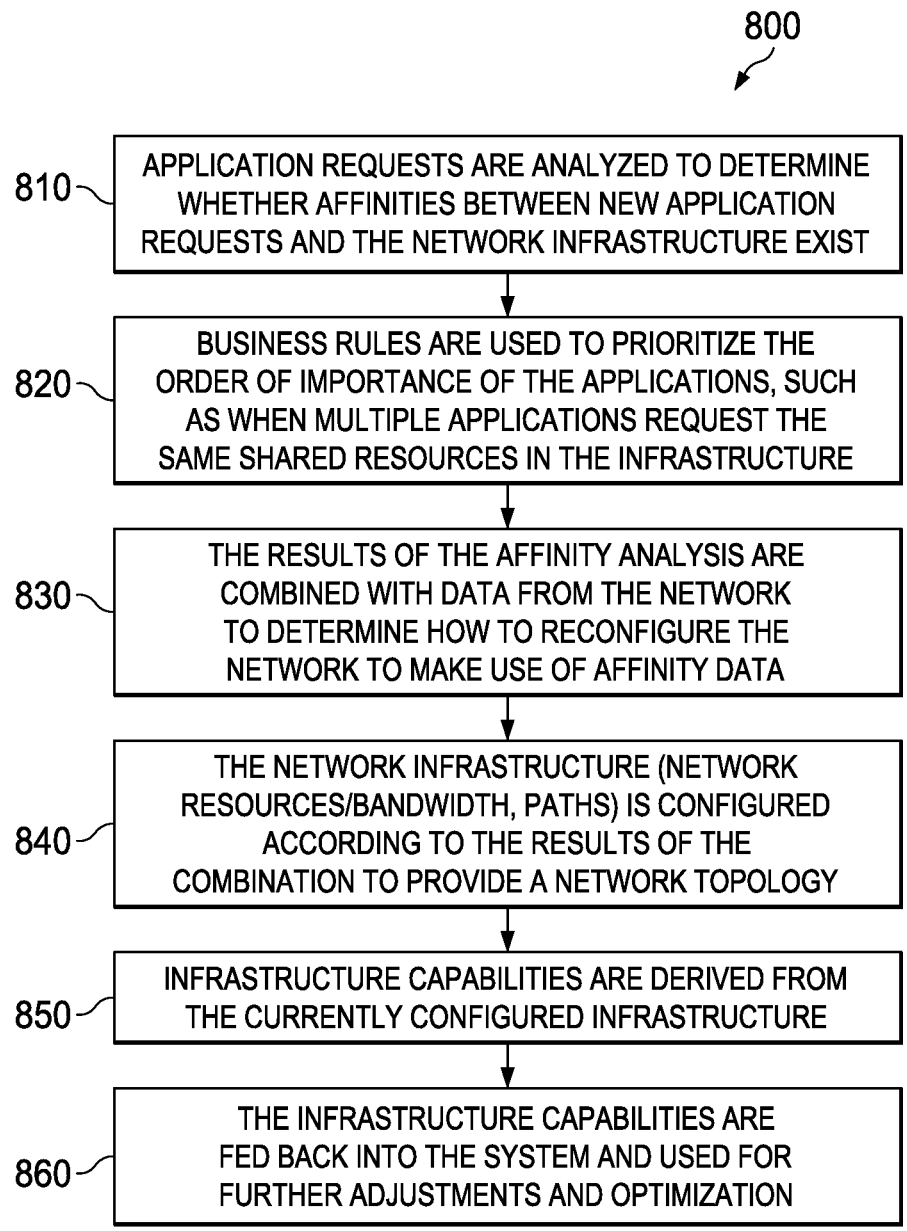
FIG. 8 illustrates an embodiment method for the model-driven affinity-based NFV management system of FIG. 1.

The elements of the embodiments above including the elements of the architecture 100 and other related modules can be implemented using software, hardware, or a combination of hardware and software. FIG. 8 shows an embodiment method 800 for the model-driven affinity-based NFV management system described above according to the architecture 100. The method can be implemented at a centralized component of the network, such as a server or a cluster of servers or virtual machines (VMs) or in a distributed manner by a plurality of communicating servers or network nodes distributed in the network.

A step 810, application requests (application requests 106) are analyzed (e.g., by affinity analysis module 110) to determine whether affinities between new application requests and the network infrastructure exist. This analysis includes step 820 where business rules (business rules 108) are used to prioritize the order of importance of the applications, such as when multiple applications request the same shared resources in the infrastructure. At a next step 830, the results of the affinity analysis are combined (e.g., by affinity computation module 112) with data from the network to determine how to reconfigure the network to make use of affinity data. At step 840, the network infrastructure (network resources/bandwidth, paths) is configured (e.g., by network management system 114) according to the results of the combination to provide a network topology (network topology 116). At step 850, infrastructure capabilities (infrastructure capabilities 118) are derived from the currently configured infrastructure. At step 860, the infrastructure capabilities are fed back into the system and used for further adjustments and optimization (by further affinity computation module 112). The steps above also rely on data models according to the applications (e.g., vendor, hardware, software, protocol). The data models are generated using a generic or universal information model, which provides the definition of entities and their relationships that are used by the managed environment, independent of platform, language, and protocol.

Figure 9:
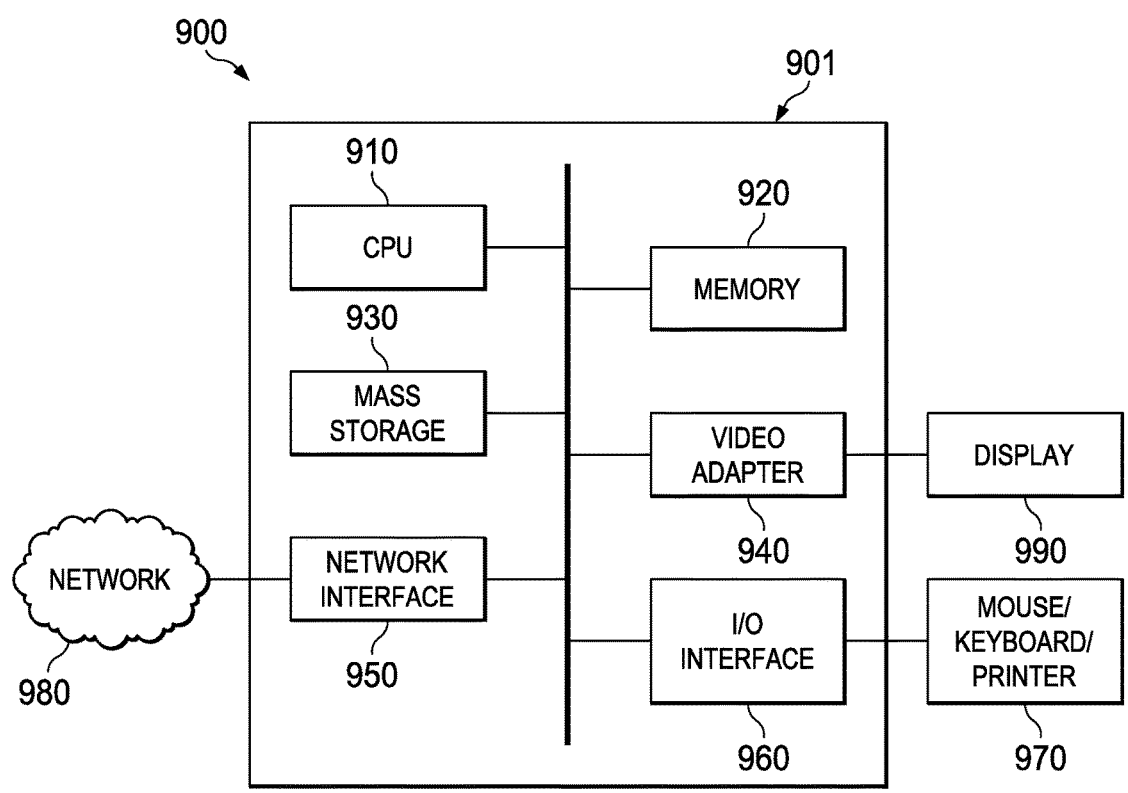
FIG. 9 is a diagram of a processing system that can be used to implement various embodiments.

FIG. 9 is a block diagram of a processing system 900 that can be used to implement various embodiments. For instance the processing system 900 can be part of a centralized component of the network such as a server, or part of each one of multiple servers that can communicate with each other in as a distributed network system. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, a memory 920, a mass storage device 930, a video adapter 940, and an I/O interface 960 connected to a bus. The bus may be one or more of any type of several bus architectures including a memory bus or memory controller, a peripheral bus, a video bus, or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The video adapter 940 and the I/O interface 960 provide interfaces to couple external input and output devices to the processing unit. As illustrated, examples of input and output devices include a display 990 coupled to the video adapter 940 and any combination of mouse/keyboard/printer 970 coupled to the I/O interface 960. Other devices may be coupled to the processing unit 901, and additional or fewer interface cards may be utilized. For example, a serial interface card (not shown) may be used to provide a serial interface for a printer.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performing affinity-based network configuration, the method comprising:

receiving, by a network component, a plurality of requests from a plurality of applications, wherein the requests represent data traffic to be analyzed to discover affinity;

determining, by the network component, that the plurality of the requests are for the same shared resource in a network infrastructure and, based thereon, determining a priority of importance of the applications;

performing, by the network component, affinity analysis on the applications based at least in part on the determined priority of importance of the applications, wherein the affinity analysis determines whether an affinity exists between at least one of the applications and the network infrastructure;

determining, by the network component, a network configuration according to results of the affinity analysis, wherein the network configuration utilizes affinity between at least one of the applications and the network infrastructure; and configuring, by the network component, the network infrastructure according to the affinity analysis and the network configuration.

2. The method of claim 1, wherein the affinity analysis is performed and the network configuration is determined according to business rules defining application and customer priorities.

3. The method of claim 2, wherein the business rules are defined using a syntax that is simpler than a low-level programming language required to configure network devices.

4. The method of claim 1, further comprising:

establishing an information model defining network entities and their relationships, wherein the information model is an object-oriented model independent of implementation technology, platform, language, and protocol; and generating at least one data model using model elements of the information model, wherein the data model is at least one of technology and vendor specific, and is used in performing the affinity analysis and determining the network configuration.

5. The method of claim 4, wherein the network entities include manageable entities that represent services and resources that can be bound or not bound by affinity and business rules, and that define and allow using rules for managing affinity-based services.

6. The method of claim 5, further comprising:

defining the business rules using the information model; and implementing the business rules using the at least one data model.

7. The method of claim 1, further comprising:

deriving network infrastructure capabilities of the configured network infrastructure using an object-oriented information model;

adjusting the results of the affinity analysis in accordance with the derived network infrastructure capabilities; and modifying the network configuration using the adjusted results of the affinity analysis, wherein the modified network configuration provides an adjusted network topology for handling the request.

8. The method of claim 1, wherein performing the affinity analysis on the applications includes analyzing traffic using a least one of network management tools, log analyzers, virtualization management tools, application discovery understanding tools, application performance management tools, and protocol analyzers.

9. The method of claim 1, wherein configuring the network infrastructure includes using a first network topology that represents a network before any new affinity calculations are made, and wherein the first network topology includes information that defines which applications and customers use which resources and paths in the network infrastructure.

10. The method of claim 1, wherein configuring the network infrastructure includes provisioning network metrics that increase infrastructure capabilities and allow network-based services, and wherein the network metrics includes at least one of bandwidth and latency values.

11. A method performing affinity-based network configuration, the method comprising:
receiving, by a network component, a plurality of requests from a plurality of applications, wherein the requests represent data traffic to be analyzed to discover affinity;
determining, by the network component, that the plurality of the requests are for the same shared resource in a network infrastructure and, based thereon, and based on business rules that define different application and customer priorities, determining a priority of importance of the applications;
detecting, by the network component, any new or changed affinities between the applications and the network infrastructure;
determining, by the network component, in accordance with the any new or changed affinities, the priority of importance of the applications, and current network infrastructure capabilities, a network topology that defines which applications and customers use which resources and paths in the network infrastructure; and
configuring, by the network component, the network infrastructure according to the network topology.

12. The method of claim 11, further comprising:
establishing an information model defining network entities and their relationships, wherein the information model is an object-oriented model independent of implementation technology, platform, language, and protocol; and
generating at least one data model using model elements of the information model, wherein the at least one data model is at least one of technology and vendor specific, and is used in detecting the affinities between the applications and the network infrastructure and in determining network topology.

13. The method of claim 12, further comprising abstracting the affinities between the applications and the network infrastructure using the information model and the at least one data model.

14. The method of claim 12, wherein the at least one data model includes data structures, operations, and rules that define how data is stored, accessed and manipulated.

15. The method of claim 12, further comprising:
generating, using model elements of the information model, a plurality of vendor-specific data models; and
determining the affinities between the applications and the network infrastructure using the vendor-specific data models.

16. The method of claim 12, further comprising:
determining affinities that exist between a plurality of sub-networks and traffic that flows between the sub-networks; and
selecting, according to the affinities and the traffic between the sub-networks, services from one or more network functions virtualization (NFV) modules; and
applying the services to each considered traffic stream.

17. The method of claim 11, wherein prioritizing the applications according to the business rules includes prioritizing flows from the applications based on at least one of customer, time of day, service level agreement (SLA), and amount of network congestion.

18. A network component for affinity-based network configuration, the network component comprising:
at least one processor; and
a non-transitory computer readable storage medium storing programming for execution by the at least one processor, the programming including instructions to:
receive a plurality of requests from a plurality of applications, wherein the requests represent data traffic to be analyzed to discover affinity;
determine that the plurality of received requests are for the same shared resource in a network infrastructure and, based thereon, determine a priority of importance of the applications;
perform affinity analysis on the applications based at least in part on the determined priority of importance of the applications, wherein the affinity analysis determines whether an affinity exists between at least one of the applications and the network infrastructure;
determine a network configuration according to results of the affinity analysis, wherein the network configuration utilizes affinity between at least one of the applications and the network infrastructure; and
configure the network infrastructure according to the affinity analysis and the network configuration.

19. The network component of claim 18, wherein the programming includes further instructions to perform the affinity analysis and determine the network configuration in accordance with business rules defined using a syntax that is conducive to program managers, analysts, and application developers, and that is simpler than a low-level programming language required to configure network devices.

20. The network component of claim 18, wherein the programming includes further instructions to:
establish an information model defining network entities and their relationships, wherein the information model is an object-oriented model independent of implementation technology, platform, language, and protocol; and
generate a data model using model elements of the information model, wherein the data model is at least one of technology and vendor specific, and is used in performing the affinity analysis and determining the network configuration.

21. The network component of claim 18, wherein the programming includes further instructions to:
derive network infrastructure capabilities of the configured network infrastructure;
adjust the results of the affinity analysis in accordance with the derived network infrastructure capabilities; and
modify the network configuration using the adjusted results of the affinity analysis, wherein the modified network configuration provides an adjusted network topology for handling the request.

* * * * *